US009871782B2

(12) United States Patent
Hakola et al.

(10) Patent No.: US 9,871,782 B2
(45) Date of Patent: Jan. 16, 2018

(54) WIRELESS COMMUNICATION SYSTEMS AND METHODS

(75) Inventors: Sami-Jukka Hakola, Kempele (FI); Samuli Turtinen, Ii (FI); Timo K. Koskela, Oulu (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 13/330,991

(22) Filed: Dec. 20, 2011

(65) Prior Publication Data
US 2013/0160101 A1 Jun. 20, 2013

(30) Foreign Application Priority Data

Dec. 19, 2011 (GB) .................................. 1121795.7

(51) Int. Cl.
*H04L 29/06* (2006.01)
*H04W 12/06* (2009.01)
*H04W 76/02* (2009.01)
*H04W 4/00* (2009.01)

(52) U.S. Cl.
CPC ......... *H04L 63/0823* (2013.01); *H04W 12/06* (2013.01); *H04W 76/023* (2013.01); *H04W 4/005* (2013.01)

(58) Field of Classification Search
CPC ... H04L 67/104; H04L 65/00; H04L 67/1091; H04L 67/1002; H04L 67/24; H04L 67/32; H04L 45/02; H04L 63/0823; H04N 21/632; G06F 17/30283; G06F 2221/0788; H04W 92/18; H04W 84/10; H04W 12/02;

(Continued)

(56) References Cited

U.S. PATENT DOCUMENTS

2002/0087887 A1* 7/2002 Busam ................. H04L 63/083
726/3
2002/0120582 A1* 8/2002 Elston .................... G06Q 20/04
705/64

(Continued)

FOREIGN PATENT DOCUMENTS

WO WO 2011/121295 * 10/2011 .............. H04W 8/02

OTHER PUBLICATIONS

EP Search Report under Section 17 for corresponding GB Patent Application No. 1121795.7 dated Apr. 19, 2012.

*Primary Examiner* — Matthew Smithers
(74) *Attorney, Agent, or Firm* — Oblon, McClelland, Maier & Neustadt, L.L.P.

(57) ABSTRACT

Embodiments of the invention provide methods, devices and computer programs arranged to control provisioning of device-to-device (D2D) communication services in a communication network. One embodiment includes an apparatus including a processing system arranged to cause the apparatus to: assign a credential of a first type to a first D2D device; store an association between a validity condition and the credential of the first type, wherein the validity condition is dependent on a characteristic of a D2D communication service; transmit data indicative of the credential of the first type for reception by the first D2D device, said credential being for use in verification of said D2D communication service to be provided by the first D2D device to a second, different, D2D device; and maintain an operative state for the D2D communication in dependence on said association.

25 Claims, 7 Drawing Sheets

(58) Field of Classification Search
CPC ....... H04W 12/08; H04W 4/02; H04W 12/06; H04W 76/023; H04W 4/005
USPC .......................................................... 726/7
See application file for complete search history.

(56) References Cited

U.S. PATENT DOCUMENTS

| | | | | |
|---|---|---|---|---|
| 2002/0174195 | A1* | 11/2002 | Meyer | H04L 29/06 709/219 |
| 2003/0033524 | A1* | 2/2003 | Tran | H04L 63/04 713/168 |
| 2003/0037261 | A1* | 2/2003 | Meffert | G06F 21/10 726/5 |
| 2005/0073982 | A1* | 4/2005 | Corneille | H04L 29/12066 370/338 |
| 2007/0022469 | A1* | 1/2007 | Cooper | H04K 1/00 726/3 |
| 2007/0204044 | A1* | 8/2007 | Rice | H04L 63/08 709/225 |
| 2009/0063851 | A1* | 3/2009 | Nijdam | H04L 63/064 713/155 |
| 2009/0132813 | A1* | 5/2009 | Schibuk | G06Q 20/223 713/158 |
| 2009/0288138 | A1* | 11/2009 | Kalofonos | H04L 9/3073 726/2 |
| 2010/0009675 | A1* | 1/2010 | Wijting et al. | 455/426.1 |
| 2010/0093364 | A1* | 4/2010 | Ribeiro et al. | 455/452.2 |
| 2010/0268775 | A1* | 10/2010 | Doppler | H04W 4/00 709/204 |
| 2010/0279672 | A1* | 11/2010 | Koskela | H04W 36/30 455/418 |
| 2011/0026704 | A1* | 2/2011 | Connelly | H04L 63/102 379/219 |
| 2011/0106952 | A1* | 5/2011 | Doppler et al. | 709/226 |
| 2011/0321141 | A1* | 12/2011 | Zeng et al. | 726/5 |
| 2012/0020213 | A1* | 1/2012 | Horneman et al. | 370/231 |
| 2012/0083283 | A1* | 4/2012 | Phan et al. | 455/450 |
| 2013/0054763 | A1* | 2/2013 | Van der Merwe | H04W 8/12 709/220 |
| 2013/0122893 | A1* | 5/2013 | Turtinen | H04W 8/005 455/423 |

* cited by examiner

WIRELESS COMMUNICATION SYSTEMS AND METHODS

TECHNICAL FIELD

The present invention relates to methods and apparatus for controlling provisioning of a device-to-device communication service. More particularly, embodiments relate to a mechanism for use in controlling access to a device-to-device communication service provided by a device.

BACKGROUND

The following meanings for the abbreviations used in this specification apply:
CN core network
D2D device-to-device
eNB enhanced node B
eNodeB enhanced node B
EPC evolved packet core
EPS evolved packet system
EUTRAN Evolved Universal Terrestrial Radio Access Network
ID identification
LTE Long Term Evolution
LTE-A LTE Advanced
MAC medium access control
MME mobility management entity
PLMN public land mobile network
RB radio bearer
RRC radio resource control
S-GW service gateway
SIB system information block
SRB signalling radio bearer
UE user equipment
UL uplink In the last few years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organisations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like, are working on standards for telecommunication network and access environments.

Recently, so-called "proximity-based" applications and services came into the focus of further developments in the field of telecommunications. The term proximity-based applications and services may be used, for example, in cases where two or more devices (i.e. two or more users), which are close to each other, are interested in exchanging data, if possible, directly with each other. Currently, such "proximity-based" applications operate fully "over the top" and are based on "high-level software", typically relying on a mix of GPS location and of the 3GPP mobile systems used as "data pipes".

However, such an approach presents fundamental technology limitations from the point of view of e.g. device battery life (due to the extensive GPS usage), signalling load to the network (due to the required uplink bursty traffic) and simplicity (due to the "proactive" behaviour required of the user, e.g. the "check in").

While the use of an unlicensed-spectrum communication can address some of the aspects mentioned earlier, it still presents some limitations. For example, discovery processes are being defined based on direct message exchanges which are thus not optimal for operation over longer ranges (hundreds of meters or more), or preserve a reasonable battery life. For the same reason, an unlicensed option cannot be expected to scale among a large number of devices.

For future cellular communication networks, a possible method of such proximity-based applications and services is the so-called device-to-device (D2D) communication. D2D offers a high communication speed, large capacity and a high quality of service, which are important features to be achieved. Advantages achievable by the implementation of D2D communications in the cellular communication environment are, for example, an offloading of the cellular system, reduced battery consumption due to lower transmission power, an increased data rate, an improvement in local area coverage robustness to infrastructure failures and also an enablement of new services. This is possible while also providing access to licensed spectrum with a controlled interference environment to avoid the uncertainties of license exempt band. Due to this, D2D communication gains more and more attraction and interest.

However, in order to make D2D communication feasible in communication networks, such as those based on 3GPP LTE systems, it is necessary to provide a fast and efficient mechanism for identifying trustworthy D2D services.

Embodiments are directed towards providing an improved method of controlling provisioning D2D services in communication networks.

SUMMARY

In a first exemplary embodiment there is provided an apparatus for use in controlling access to a device-to-device (D2D) communication service provided by a first D2D device in a communication network, the apparatus comprising at least one processor; and at least one memory including computer program code; the at least one memory and the computer program code being configured to, with the at least one processor, cause the apparatus at least to: assign a credential of a first type to the first D2D device; store an association between a validity condition and the credential of the first type, wherein the validity condition is dependent on a characteristic of the D2D communication service; transmit data indicative of the credential of the first type for reception by the first D2D device, said credential being for use in verification of said D2D communication service to be provided by the first D2D device to a second, different, D2D device; and maintain an operative state for the D2D communication service in dependence on said association.

In a second exemplary embodiment there is provided a method of controlling access to a device-to-device (D2D) communication service provided by a first D2D device in a communication network, the method comprising: assigning a credential of a first type to the first D2D device; storing an association between a validity condition and the credential of the first type, wherein the validity condition is dependent on a characteristic of the D2D communication service; transmitting data indicative of the credential of the first type for reception by the first D2D device, said credential being for use in verification of said D2D communication service to be provided by the first D2D device to a second, different, D2D device; and maintaining an operative state for the D2D communication service in dependence on said association.

The first and second exemplary embodiments are most conveniently implemented in a service gateway. Embodiments also include a computer program comprising a set of instructions, which, when executed by a service gateway, cause the service gateway to perform a method according to the second embodiment.

In a third exemplary embodiment there is provided an apparatus for use in controlling access to a device-to-device (D2D) communication service provided by a D2D device in a communication network, the apparatus comprising at least one processor; and at least one memory including computer program code; the at least one memory and the computer program code being configured to, with the at least one processor, cause the apparatus at least to: receive a credential of a first type associated with the D2D device, said credential of the first type being suitable for use in verification of said D2D communication service provided by the D2D device; assign a credential of a second type to the D2D device, said credential of the second type being suitable for use by the D2D device in establishing access to the communication network; and transmit data indicative of the credential of the first type and the credential of the second type for receipt by the D2D device.

In a fourth exemplary embodiment there is provided a method of controlling access to a device-to-device (D2D) communication service provided by a D2D device in a communication network, the method comprising: receiving a credential of a first type associated with the D2D device, said credential of the first type being suitable for use in verification of said D2D communication service provided by the D2D device; assigning a credential of a second type to the D2D device, said credential of the second type being suitable for use by the D2D device in establishing access to the communication network; and transmitting data indicative of the credential of the first type and the credential of the second type for receipt by the D2D device.

The third and fourth exemplary embodiments are most conveniently implemented in a MME. Embodiments also include a computer program comprising a set of instructions, which, when executed by a MME, cause the MME to perform a method according to the fourth embodiment.

In a fifth exemplary embodiment there is provided an apparatus for use in provisioning a device-to-device (D2D) communication service by a first D2D device within a communication network, the apparatus comprising at least one processor; and at least one memory including computer program code; the at least one memory and the computer program code being configured to, with the at least one processor, cause the apparatus at least to: transmit a D2D discovery signal comprising data indicative of a first credential of a first type for reception by a second, different, D2D device; receive a second, different, credential of the first type; and thereafter transmit a further, different, D2D discovery signal comprising data indicative of said second credential of the first type, wherein said first and second credentials are suitable for use in verification of said D2D communication service.

In a sixth exemplary embodiment there is provided a method of provisioning a device-to-device (D2D) communication service by a first D2D device within a communication network, the method comprising: transmitting a D2D discovery signal comprising data indicative of a first credential of a first type for reception by a second, different, D2D device; receiving a second, different, credential of the first type; and thereafter transmitting a further, different, D2D discovery signal comprising data indicative of said second credential of the first type, wherein said first and second credentials are suitable for use in verification of said D2D communication service.

The fifth and sixth exemplary embodiments are most conveniently implemented in a UE. Embodiments also include a computer program comprising a set of instructions, which, when executed by a UE, cause the UE to perform a method according to the sixth embodiment.

In a seventh exemplary embodiment there is provided an apparatus for use in controlling access to a device-to-device (D2D) communication service in a communication network, the apparatus comprising at least one processor; and at least one memory including computer program code; the at least one memory and the computer program code being configured to, with the at least one processor, cause the apparatus at least to: receive a D2D discovery signal comprising data indicative of a credential of a first type corresponding to said D2D communication service; selectively transmit a first message comprising data indicative of said credential of the first type so as to verify said D2D communication service; and thereafter in response to receiving an indication that said D2D communication service is authorised for said communication network, selectively transmit a second message whereby to request access to said D2D communication service.

In an eighth exemplary embodiment there is provided a method of controlling access to a device-to-device (D2D) communication service in a communication network, the method comprising: receiving a D2D discovery signal comprising data indicative of a credential of a first type corresponding to said D2D communication service; selectively transmitting a first message comprising data indicative of said credential of the first type so as to verify said D2D communication service; and thereafter in response to receiving an indication that said D2D communication service is authorised for said communication network, selectively transmitting a second message whereby to request access to said D2D communication service.

The seventh and eighth exemplary embodiments are most conveniently implemented in a UE. Embodiments also include a computer program comprising a set of instructions, which, when executed by a UE, cause the UE to perform a method according to the eighth embodiment.

These and other embodiments and aspects are detailed below with particularity.

DETAILED DESCRIPTION

Embodiments are concerned with controlling access to device-to-device (D2D) communication services in a communication network so as to prevent access to unauthorised D2D service providers.

In the following, examples and embodiments of the present invention are described with reference to the drawings. For illustrating the present invention, the examples and embodiments will be described in connection with a cellular communication network based on a 3GPP LTE system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication networks comprising a wired or wireless access network subsystem and a core network. Such an architecture may comprise one or more mobility management entities (MME), one or more access network control elements and radio access network elements, such as a base station (BS), eNodeB or eNB, with which a communication network element or device such as a UE or another device having a similar function, such as a modem chipset, a chip, a module etc., which can also be part of a UE or attached as a separate element to a UE, or the like, is able to communicate via one or more channels for transmitting several types of data.

The network is in communication with various D2D management entities, namely a service gateway, a D2D registration server and a packet gateway, which control provisioning of D2D communication services.

The general functions and interconnections of the described elements, which also depend on the actual network type, are known to those skilled in the art and described in corresponding specifications, so that a detailed description thereof is omitted herein. However, it is to be noted that several additional network elements and signalling links may be employed for a communication connection to or from UEs or eNBs, besides those described in detail herein below.

Figure 1:
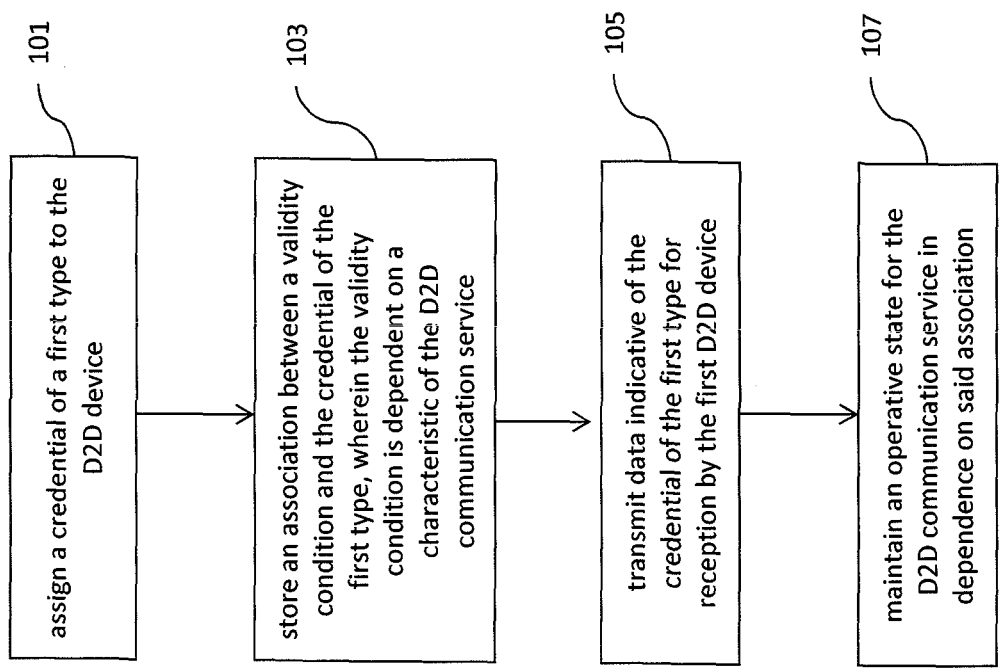
FIG. 1 is a logic flow diagram that illustrates the operation of a method, and a result of execution of computer program instructions embodied on a computer readable memory, in accordance with exemplary embodiments.
Figure 2:
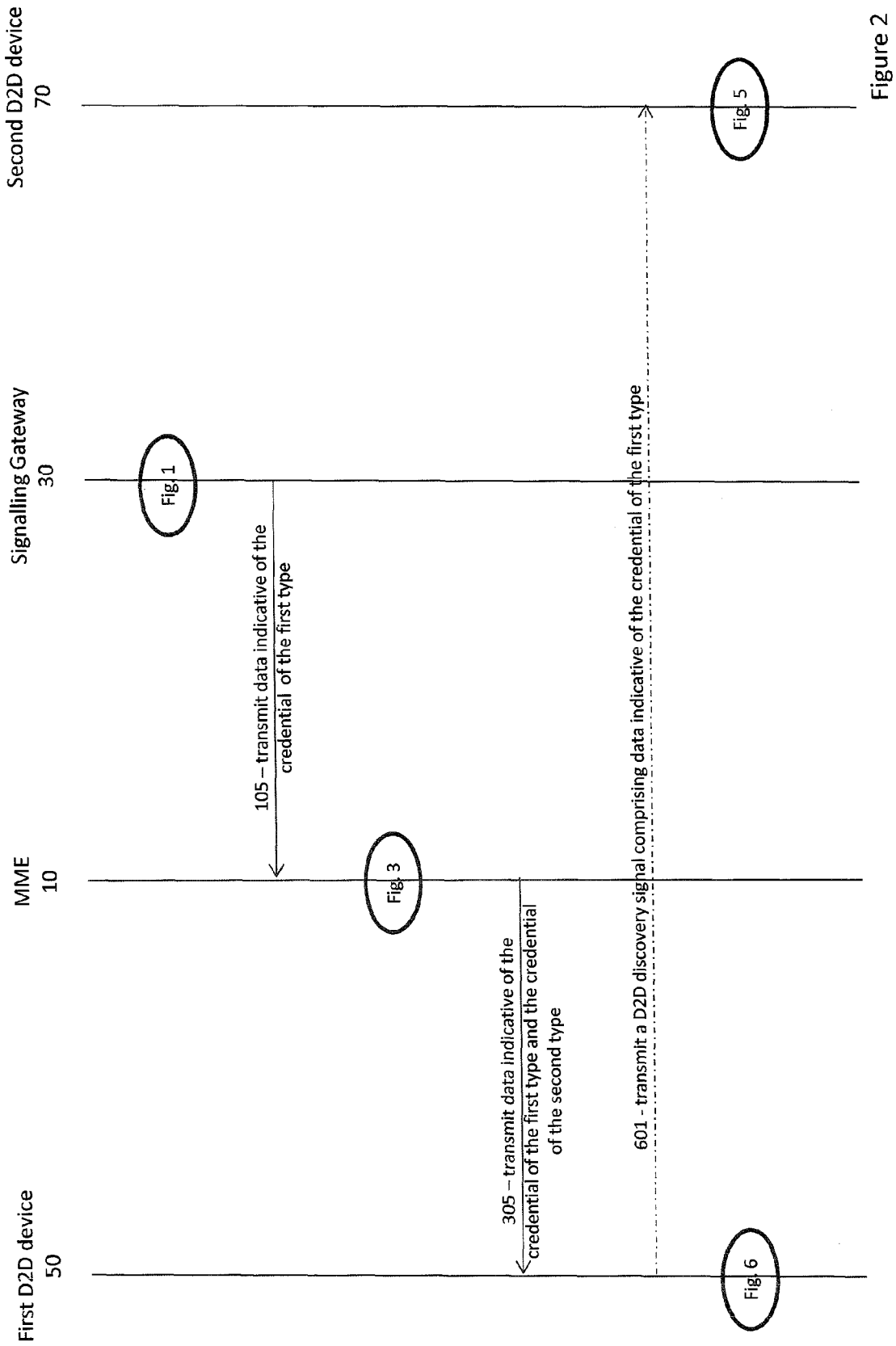
FIG. 2 is a flow diagram that illustrates the various steps performed by UE, MME and service gateway according to embodiments.

Referring to FIGS. 1 and 2, in accordance with an exemplary embodiment, the afore-mentioned service gateway 30 assigns a credential of a first type to a D2D communication service provided by a UE 50 (hereinafter first D2D device) (step 101). The credential of the first type, for example a service credential, is for use in verification of the D2D communication service to be provided by the first D2D device to a further UE 70 (hereinafter second D2D device). The service gateway 30 additionally stores an association between the service credential and a validity condition, in which the validity condition is dependent on a characteristic of the D2D communication service (step 103). Thereafter, the service gateway 30 transmits data indicative of the service credential for reception by the first D2D device 50 (step 105). The service gateway 30 further maintains an operative state for the D2D communication service in dependence on the association between the service credential and the validity condition (step 107).

As will be explained in more detail below, the first D2D device 50 can then transmit a D2D discovery signal comprising data indicative of the service credential for use by the second D2D device 70 in verification of the D2D communication service. Therefore, by provisioning the D2D communication service with the service credential, the service gateway 30 effectively authorises the D2D communication service for the network. In effect, the service gateway 30 registers the D2D communication service for the network. Furthermore, by associating a validity condition with the service credential, the service gateway 30 can actively control the operative state of authorised D2D communication services on the basis of the validity condition.

The service gateway 30 is arranged to maintain a first or second operative state in relation to the D2D communication. In the first operative state, the first D2D device 50 is authorised to provide the D2D communication service to the second D2D device 70. By comparison, in the second operative state, the first D2D device 50 is not authorised to provide the D2D communication service to the second D2D device 70. It will be understood that, the first and second operative states may correspond to all user equipments in the network or to a subset thereof.

In preferred arrangements, the validity condition comprises a validity time period, in which, subsequent to expiry of the validity time period, the service gateway 30 is arranged to change the operative state associated with the D2D communication service to the second operative state. In at least some arrangements the service gateway 30 associates validity time periods with D2D communication services on the basis of their type. Thus, for example, the service gateway 30 may associate shorter validity time periods with critical services, such as law and enforcement D2D communication services. Accordingly, the above-mentioned characteristic of the D2D communication service may identify a type of service.

Embodiments of the invention provide a particularly advantageous mechanism for reinstating authorisation for D2D communication services determined to be in the second operative state, as will now be explained. When the D2D communication service is determined to be in the second operative state, the service gateway 30 may assign and transmit a further service verification credential for receipt by the first D2D device 50. Subsequently, the service gateway 30 may change the operative state associated with the D2D communication service to the first operative state, thereby reinstating authorisation for the D2D communication service. The service gateway 30 may perform the above-described determination of the operative state periodically of its own volition, or it may perform such determination in response to a request comprising data indicative of the D2D communication service.

In at least some arrangements the request may originate from the second D2D device 70, in which case the request serves to confirm whether the D2D communication service is authorised for the network. In this way, authorisation for the D2D communication service may be reinstated when the second D2D device 70 is interested in accessing the service. As will be explained below, the request may be part of a network-based service verification mechanism, in which D2D devices request a network entity, such as the service gateway 30 or the like, to verify D2D communication services. In response to receiving the request, the service gateway 30 may transmit an indication as to whether or not the D2D communication service is authorised for the network, the indication being for receipt by the second D2D device 70. Therefore, the network-based service verification mechanism enables D2D devices to confirm whether a D2D communication service is authorised and enables a network-based entity to control provisioning of D2D communication services.

Further, in response to receiving the request, the service gateway 30 may additionally determine whether the second D2D device 70 is authorised to access the D2D communication service, and transmit an indication indicative of the result of the determination for receipt by the second D2D device 70, thereby combining service and device verification.

In preferred arrangements, the service gateway 30 may additionally assign and transmit a credential of a second type, for example a service authentication credential, for use by the second D2D device 70 in verification of the D2D communication service. In at least some arrangements, the service authentication credential is suitable for verifying the aforementioned service credential corresponding to a D2D communication service. In this way the second D2D device 70 may verify D2D communication services locally without having to initiate network-based service verification.

The service credential that is associated with the validity condition may comprise one or more of: a security key, an identifier or a check word.

The service gateway 30 may additionally maintain a list of D2D communication services determined to be in the first operative state, which, as will be appreciated, is indicative of D2D communication services that are authorised for the communication network. The service gateway 30 may transmit the list to a network entity, such as the MME 10, whereby to enable the network entity to respond to the above-mentioned service verification requests.

For completeness, it is to be noted that the above-described transmission of the service credential at step 105 may be in response to a request. The request for a service credential may be transmitted by the first D2D device 50 or any other network entity, such as the MME 10.

In accordance with a first embodiment and as will be seen in FIG. 2, the service credential transmitted by the service gateway at step 105 is received by the MME 10, the steps performed by which will now be explained with reference to FIG. 3. Having received the service credential from the service gateway (301), the MME 10 assigns a credential of a third type, for example a network credential, to the first D2D device, which is suitable for use by the first D2D device 50 in establishing access to the communication network (step 303). Thereafter, the MME 10 transmits data indicative of the service and network credentials for receipt by the first D2D device 50 (step 305).

The MME 10 may combine the service credential and network credential prior to transmission at step 303. The MME 10 may also periodically assign a further network credential to the first D2D device 50.

Figure 4:
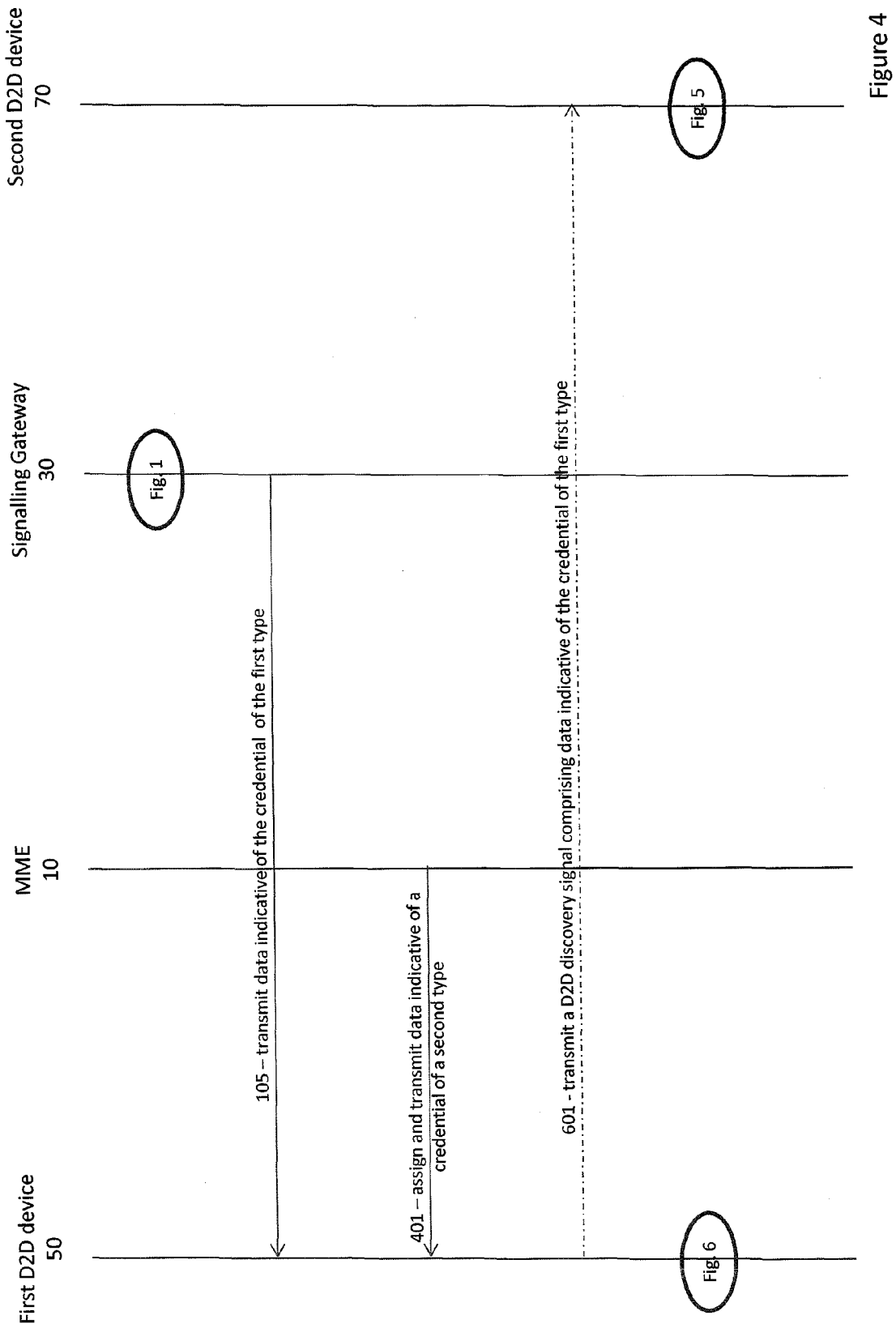
FIG. 4 is a flow diagram that illustrates the various steps performed by UE, MME and service gateway according to embodiments.

In accordance with a second embodiment and as will be seen in FIG. 4, the signalling gateway 30 may transmit the service credential at step 105 to the first D2D device 50; separately the MME 10 assigns and transmits a network credential to the first D2D device 50 (step 401). Thus, provisioning of service and network credentials may be performed at different planes. For example, the service credential may be provided via the user plane and the network credential may be provided via the control plane.

An overview of the steps performed by the first D2D device when broadcasting the availability of the now authorised D2D communication service will now be described. Having received the service credential either directly from the service gateway 30 (FIG. 4) or via the MME 10 (FIG. 2), the first D2D device 50 transmits a D2D discovery signal (step 601) comprising data indicative of the service credential for receipt by the second D2D device 70. The D2D discovery signal is a broadcast message announcing availability of a D2D communication service to devices in proximity and is received by entirely conventional methods by the second D2D device 70. The D2D discovery signal may further comprise data indicative of the network credential.

Figure 5:
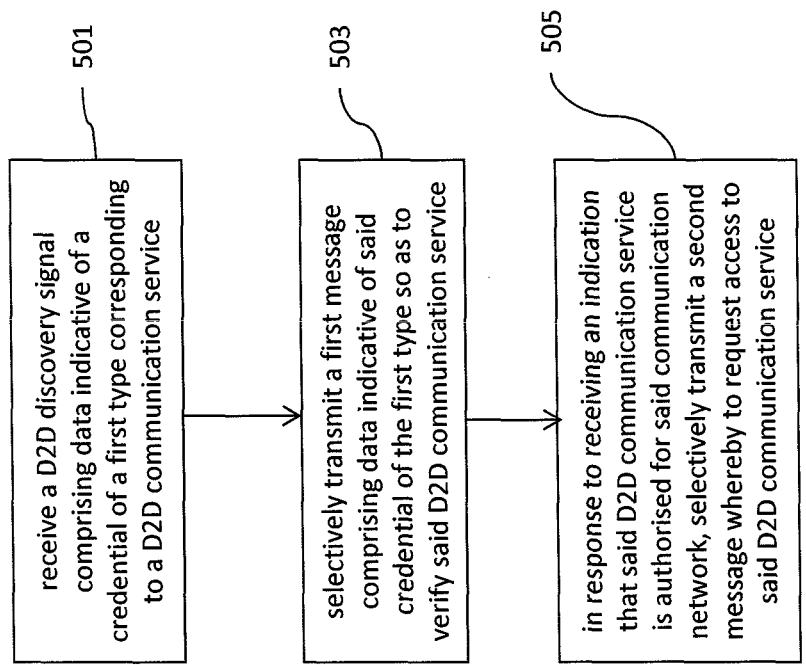
FIG. 5 is a logic flow diagram that illustrates the operation of a method, and a result of execution of computer program instructions embodied on a computer readable memory, in accordance with exemplary embodiments.

Turning to FIG. 5, an overview of the steps performed by the second D2D device 70 in response to receiving the D2D discovery signal will now be described. In response to receiving the D2D discovery signal indicative of a service credential (step 601), the second D2D device 70 selectively transmits a service verification message comprising data indicative of the received service credential so as to verify the corresponding D2D communication service (step 503). Thereafter, in response receiving an indication that the D2D communication service is authorised for the communication network, the second D2D device 70 selectively transmits a second message whereby to request access to the D2D communication service (step 505).

Transmission of the service verification message is selective because the second D2D device 70 may initially attempt to verify the D2D communication service on the basis of the above-described service authentication credential received from the service gateway 30. Thereafter, and in the event that the verification is unsuccessful or inconclusive, the second D2D device 70 may transmit the service verification message, thereby advantageously combining the above-described network-based service verification mechanism with the device-based service verification mechanism.

As described above, the service gateway 30 may reinstate authorisation of a D2D communication service that is determined to be in the second operative state by assigning a further service credential. The first D2D device 50, in response to receiving the further service credential, may discard the earlier service credential and transmits a further D2D discovery signal comprising data indicative of the further service credential. Similarly, in response to receiving a further network credential from the MME 10, as described above, the first D2D device 50 may transmit a further D2D discovery signal comprising data indicative thereof.

As regards the above-mentioned service verification message, in at least some arrangements, the service verification request is transmitted in a control plane message. In this case, the service verification request transmitted by the D2D device 70 at step 503 is for receipt by a CN entity, such as the afore-mentioned MME 10 or the like. As is well known, control plane messages are transmitted using a Signal Radio Bearer (SRB), and their transmission is prioritised by the CN. Transmitting the service verification request in a control plane message is therefore advantageous in that it enables the verification requests to be transmitted as quickly as possible.

The control plane message may be a Non Access Stratum (NAS) message. Accordingly, if, for example, if the second D2D device 70 were in RRC_IDLE state, the second D2D device 70 would transmit the NAS message in a RRC signalling message, so as to cause transition into a different RRC state, such as RRC_CONNECTED state. The RRC signalling message comprising the NAS message is for receipt by the MME 10, which, in response to receipt thereof, processes an RRC portion of the message according to conventional procedures, and transmits the service verification message comprised therein to a service verification entity, such as the service gateway 30. In the event that the above-described list of authorised D2D communication services is accessible to the MME 10, it may additionally process the service verification request 10 on the basis thereof. The above-mentioned RRC signalling messages comprise a RRCConnectionRequest or a RRCConnectionSetupComplete message. The service verification message may alternatively comprise a non-3GPP dedicated tunnelled information message.

Thus, the embodiments advantageously combine service verification with RRC connection establishment, thereby simultaneously causing the D2D device 70 to transit into a state in which it can access the D2D communication service. Accordingly, the embodiments enable fast and efficient service verification and access.

FIG. 1 is a logic flow diagram which describes, broadly, the above exemplary embodiments from the perspective of a service gateway 30.

Figure 3:
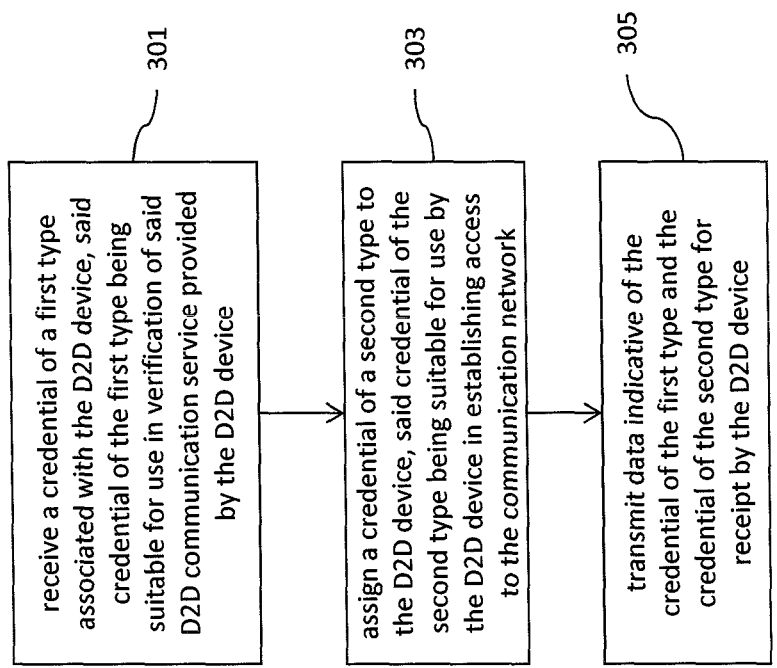
FIG. 3 is a logic flow diagram that illustrates the operation of a method, and a result of execution of computer program instructions embodied on a computer readable memory, in accordance with exemplary embodiments.

FIG. 3 is a logic flow diagram which describes, broadly, the above exemplary embodiments from the perspective of a MME 10.

FIG. 5 is a logic flow diagram which describes, broadly, the above exemplary embodiments from the perspective of the second D2D device 70.

Figure 6:
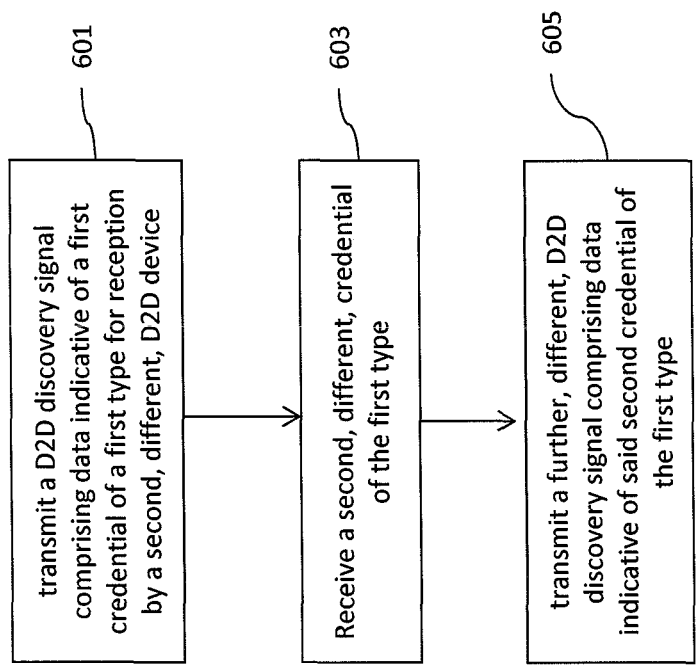
FIG. 6 is a logic flow diagram that illustrates the operation of a method, and a result of execution of computer program instructions embodied on a computer readable memory, in accordance with exemplary embodiments.

FIG. 6 is a logic flow diagram which describes, broadly, the above exemplary embodiments from the perspective of the first D2D device 50. In step 601, the first D2D device 50 transmits a D2D discovery signal comprising data indicative of a service credential for receipt by the second D2D device 70. At step 603, the first D2D device 50 receives a further service credential. Thereafter, at step 605, the first D2D device 50 transmits a further D2D discovery signal comprising data indicative of the further service credential.

FIGS. 1, 3, 5 and 6 represent results from executing a computer program or an implementing algorithm stored in the local memory of the service gateway 10, the MME 10, the second D2D device 70 and the first D2D device 50 respectively as well as illustrating the operation of a method and a specific manner in which the processor and memory with computer program/algorithm are configured to cause the service gateway 30, the MME 10, the second D2D device 70 and the first D2D device 50 respectively (or one or more components thereof) to operate. The various blocks shown in these Figures may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 7:
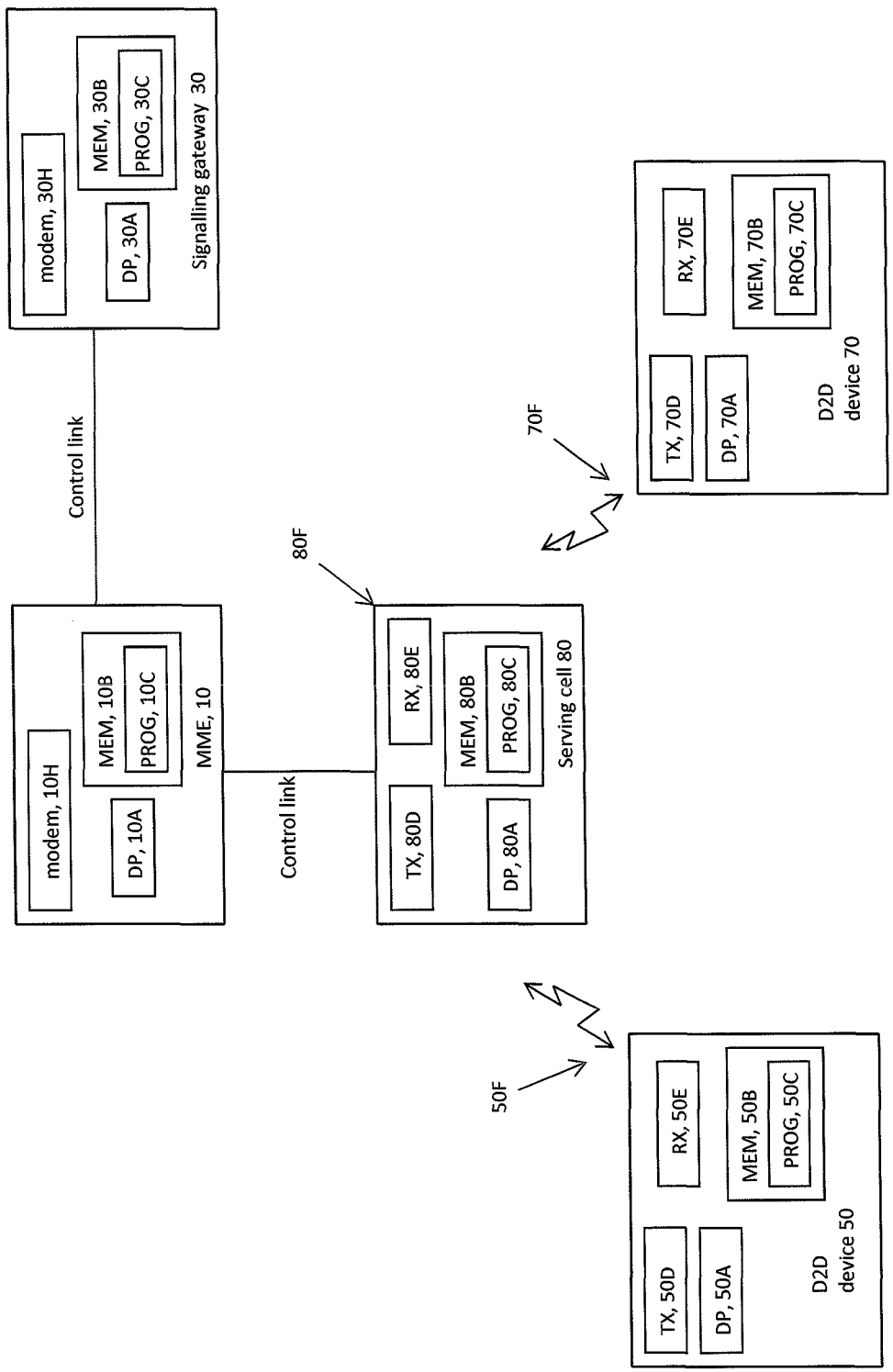
FIG. 7 is a simplified block diagram of various network devices, which are exemplary electronic devices suitable for use in practicing the exemplary embodiments.

Reference is now made to FIG. 7 for illustrating a simplified block diagram of various electronic devices and apparatus that are suitable for use in practicing the exemplary embodiments of this invention. In FIG. 7 a serving cell 80 is adapted for communication over a wireless link with a mobile apparatus, such as a mobile terminal or devices 50 and 70. The serving cell 80 may be a macro eNodeB, a remote radio head or relay station, or other type of base station/cellular network access node.

The devices 50 and 70 include processing means such as at least one data processor (DP) 50A and 70A, storing means such as at least one computer-readable memory (MEM) 50B and 70B storing at least one computer program (PROG) 50C and 70C, and also communicating means such as a transmitter TX 50D and 70D and a receiver RX 50E and 70E for bidirectional wireless communications with the serving cell 80 via one or more antennas 50F and 70F.

The serving cell 80 includes its own processing means such as at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 7 as a control link which in the LTE system may be implemented as an S1 interface, coupling the serving cell 80 with the MME 10 and over which the serving cell 80 may receive the service, network and service authentication credentials in various embodiments above.

The MME 10 includes processing means such as at least one data processor (DP) 10A, storing means such as at least one computer-readable memory (MEM) 10B storing at least one computer program (PROG) 10C, and communicating means such as a transmitter TX 10D and a receiver RX 10E for bidirectional wireless communications with the serving cell 80.

Similarly, the service gateway 30 includes processing means such as at least one data processor (DP) 30A, storing means such as at least one computer-readable memory (MEM) 30B storing at least one computer program (PROG) 30C, and communicating means such as a modem 30H for bidirectional communication with the MME 10 over the control link. While not particularly illustrated for the devices 50 and 70 and the serving cell 80, those devices are also assumed to include as part of their wireless communicating means a modem which may be inbuilt on a radiofrequency RF front end chip within those devices 50, 70, 80 and which chip also carries the TX 50D/70D/80D and the RX 50E/70E/80E. The service gateway 30 also has stored in its local memory at 30G the database which has the service credentials for all D2D communication services authorised for the network and the service authentication credentials for devices 70 authorised to access them, as the case may be for the various embodiments detailed above.

At least one of the PROGs 50C in the UE 50 is assumed to include program instructions that, when executed by the associated DP 50A, enable the device to operate in accordance with the exemplary embodiments of this invention, as detailed above. Similarly, at least one of the PROGs 70C in the UE 70 is assumed to include program instructions that, when executed by the associated DP 70A, enable the device to operate in accordance with the exemplary embodiments of this invention, as detailed above. The MME 10 and the service gateway 30 also have software stored in their respective MEMs to implement certain aspects of these teachings. In these regards the exemplary embodiments of this invention may be implemented at least in part by computer software stored on the MEM 50B, 70B, 10B, 30B which is executable by the DP 50A of the device 50, DP 70A of the device 70, DP 10A of the MME 10 and/or DP 30A of the service gateway 30A, or by hardware, or by a combination of tangibly stored software and hardware (and tangibly stored firmware). Electronic devices implementing these aspects of the invention need not be the entire devices as depicted at FIG. 7, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 10B, 30B, 50B, 70B and 80B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 10A, 30A, 50A, 70A and 80A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A service gateway for use in controlling access to a device-to-device (D2D) communication service provided by a first D2D device in a communication network, the service gateway comprising:
   circuitry configured to
   assign a service credential to the first D2D device;
   store an association between a validity condition and the service credential, wherein the validity condition is dependent on a characteristic of the D2D communication service;
   transmit data indicative of the service credential for reception by the first D2D device, said service credential being transmitted in a D2D discovery signal directly from the first D2D device to a second, different, D2D device without passing through the service gateway for use in verification that the service gateway has authorized said D2D communication service to be provided by the first D2D device to the second D2D device; and
   maintain an operative state for the D2D communication service in dependence on said association.

2. The service gateway according to claim 1, wherein said operative state is a first operative state, and the circuitry is configured to maintain said first operative state and a second, different, operative state for the D2D communication service, the first operative state being one in which said first D2D device is authorized to provide the D2D communication service to the second D2D device.

3. The service gateway according to claim 2, wherein the validity condition comprises a validity time period, wherein, subsequent to expiry of the validity time period, the circuitry is configured to change said first operative state for the D2D communication service to said second operative state.

4. The service gateway according to claim 2, wherein
   in the event that the D2D communication service is determined to be in the second operative state, the circuitry is configured to cause the service gateway to assign and transmit a further, different, service credential for reception by the first D2D device.

5. The service gateway according to claim 4, wherein the circuitry is configured to cause the service gateway to perform said determination periodically.

6. The service gateway according to claim 4, wherein the circuitry is configured to cause the service gateway to perform said determination in response to a request message from said second D2D device including the service credential received in the D2D discovery signal transmitted by the first D2D device.

7. The service gateway according to claim 6, wherein, responsive to receiving said request message, the circuitry is configured to cause the service gateway to determine whether said second D2D device is authorized to access said D2D communication service.

8. The service gateway according to claim 6, wherein the circuitry is configured to cause the service gateway to transmit a response message for receipt by the second D2D device, the response message comprising data indicative of the result of said determination.

9. The service gateway according to claim 2, wherein the circuitry is configured to cause the service gateway to maintain a list of D2D communication services determined to be in the first operative state.

10. The service gateway according to claim 9, wherein the circuitry is configured to cause the service gateway to transmit said list to a mobility management entity associated with said communication network.

11. The service gateway according to claim 1, wherein the circuitry is configured to cause the service gateway to assign and transmit a service authentication credential for reception by the second D2D device, said service authentication credential being suitable for use in verification of said D2D communication service.

12. The service gateway according to claim 1, wherein the characteristic comprises a type of the D2D communication service.

13. A method of operating a service gateway for controlling access to a device-to-device (D2D) communication service provided by a first D2D device in a communication network, the method comprising:
   assigning a service credential to the first D2D device;
   storing an association between a validity condition and the service credential, wherein the validity condition is dependent on a characteristic of the D2D communication service;
   transmitting data indicative of the service credential for reception by the first D2D device, said service credential being transmitted in a D2D discovery signal directly from the first D2D device to a second, different, D2D device without passing through the service gateway for use in verification of said D2D communication service authorized by the service gateway to be provided by the first D2D device to the second D2D device; and maintaining an operative state for the D2D communication service in dependence on said association.

14. An apparatus for use in provisioning a device-to-device (D2D) communication service by a first D2D device within a communication network, the apparatus comprising:
circuitry configured to
  transmit a D2D discovery signal comprising data indicative of a first service credential for reception by a second, different, D2D device;
  receive a second, different, service credential; and
  transmit another D2D discovery signal comprising data indicative of said second service credential, wherein said first and second service credentials are suitable for use in verification that said D2D communication service is authorized for the first D2D device and the second D2D device to communicate directly with each other wirelessly without passing through a network control element.

15. The apparatus according to claim 14, wherein the circuitry is configured to cause the first D2D device to receive a network credential, said network credential being suitable for use by the first D2D device in establishing access to the communication network.

16. The apparatus according to claim 14, wherein said D2D discovery signal and said another D2D discovery signal each comprise data indicative of said network credential.

17. An apparatus for use in controlling access to a device-to-device (D2D) communication service to make direct communication between two or more D2D devices in a communication network, the apparatus comprising:
circuitry configured to
  receive a D2D discovery signal comprising data indicative of a service credential corresponding to said D2D communication service;
  selectively transmit a first message comprising data indicative of said service credential so as to verify said D2D communication service is authorized; and
  selectively transmit a second message that requests access to said D2D communication service in response to receiving an indication that said D2D communication service is authorized for said communication network wirelessly without passing through a network control element.

18. The apparatus according to claim 17, wherein the circuitry is configured to:
receive a service authentication credential, said service authentication credential being suitable for verifying said D2D communication service;
verify said D2D communication service on the basis of said service authentication credential; and
transmit said first message in the event that said verification is unsuccessful.

19. The apparatus according to claim 17, wherein the first message comprises a Non Access Stratum (NAS) message.

20. The apparatus according to claim 19, wherein, while in a Radio Resource Control (RRC) idle operative mode, a D2D device comprising said apparatus is configured to transmit said NAS message in a RRC signaling message, so as to cause the D2D device to transition into an RRC operative mode other than said RRC idle operative mode.

21. The apparatus according to claim 20, wherein said RRC signaling message comprises a RRCConnectionRequest or a RRCConnectionSetupComplete message.

22. The apparatus according to claim 17, wherein the first message comprises a non-3GPP dedicated information message.

23. A mobile terminal comprising:
circuitry configured to
  receive, from a base station, a service credential corresponding to a device-to-device (D2D) communication service;
  transmit a D2D discovery signal including the service credential directly to a second mobile terminal without passing through the base station; and
  perform D2D communication with the second mobile terminal based on a verification of the service credential by the second mobile terminal.

24. The mobile terminal of claim 23, wherein the circuitry is configured to:
receive, directly from a third mobile terminal without passing through the base station, a second D2D discovery signal including a second service credential corresponding to a second D2D communication service;
transmit, to the base station, a request message including the second service credential; and
receive, from the base station, a response message indicating whether the mobile terminal is authorized to access the second D2D service based on the transmitted request message.

25. The mobile terminal of claim 23, wherein the circuitry is configured to:
receive a second service credential from the base station; and
transmit a D2D discovery message to the second mobile terminal without passing through the base station, wherein
the second mobile terminal is configured to determine whether it is permitted to access the D2D service based on the first and second service credentials.

* * * * *

UNITED STATES PATENT AND TRADEMARK OFFICE
CERTIFICATE OF CORRECTION

PATENT NO. : 9,871,782 B2
APPLICATION NO. : 13/330991
DATED : January 16, 2018
INVENTOR(S) : Sami-Jukka Hakola et al.

Page 1 of 1

It is certified that error appears in the above-identified patent and that said Letters Patent is hereby corrected as shown below:

On the Title Page

Item (57) ABSTRACT, Line 15, after "communication" insert --service--.

Signed and Sealed this
Twenty-eighth Day of May, 2019

Andrei Iancu
*Director of the United States Patent and Trademark Office*